United States Patent
Badawy et al.

(10) Patent No.: US 10,096,229 B2
(45) Date of Patent: Oct. 9, 2018

(54) OBJECT DETECTION

(71) Applicant: Intelliview Technologies, Inc., Calgary (CA)

(72) Inventors: Wael Badawy, Calgary (CA); Choudhury A. Rahman, Calgary (CA)

(73) Assignee: Intelliview Technologies, Inc., Calgary (CA)

( * ) Notice: Subject to any disclaimer, the term of this patent is extended or adjusted under 35 U.S.C. 154(b) by 632 days.

(21) Appl. No.: 13/873,114

(22) Filed: Apr. 29, 2013

(65) Prior Publication Data

US 2014/0320666 A1    Oct. 30, 2014

(51) Int. Cl.
| | |
|---|---|
| G08B 21/12 | (2006.01) |
| H04N 7/18 | (2006.01) |
| G06K 9/00 | (2006.01) |
| G06T 7/00 | (2017.01) |
| G06T 7/254 | (2017.01) |

(52) U.S. Cl.
CPC ......... G08B 21/12 (2013.01); G06K 9/00771 (2013.01); G06T 7/0004 (2013.01); G06T 7/254 (2017.01); H04N 7/18 (2013.01); *G06T 2207/10016* (2013.01); *G06T 2207/10024* (2013.01); *G06T 2207/10048* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 2,915,975 A | 12/1959 | Kittrell et al. | |
| 3,180,134 A | 4/1965 | Wadlington | |
| 3,276,246 A | 10/1966 | Truman et al. | |
(Continued)

FOREIGN PATENT DOCUMENTS

| | | | |
|---|---|---|---|
| CA | 1 242 506 A | 9/1988 | |
| CA | 1 255 795 A | 6/1989 | |
(Continued)

OTHER PUBLICATIONS

Wren, C., et al., "Pfinder: Real-Time Tracking of the Human Body," IEEE Transactions on Pattern Analysis and Machine Intelligence 19(7):780-785, Jul. 1997.

(Continued)

*Primary Examiner* — Curtis King
(74) *Attorney, Agent, or Firm* — Christensen O'Connor Johnson Kindness, PLLC

(57) ABSTRACT

An object detection apparatus comprising a camera having video output comprising frames; and a digital video processor configured to receive the video output from the camera, detect and track a blob in the frames to determine a trajectory for the blob and trigger an alert message if the trajectory of the blob is characteristic of an object to be detected. The digital video processor may detect and classify the object as a leak, and provide an alert or alarm. The digital video processor may detect and classify the object as a bird, and provide a bird report. A weather station may be combined with the digital video processor to receive input from the weather station and take the input from the weather station into account in determining whether to trigger an alert.

9 Claims, 8 Drawing Sheets

(56) References Cited

U.S. PATENT DOCUMENTS

| | | | |
|---|---|---|---|
| 3,958,607 A | 5/1976 | Gray | |
| 3,967,678 A | 7/1976 | Blackwell | |
| 4,023,201 A | 5/1977 | Faulkner | |
| 4,045,671 A | 8/1977 | Dille et al. | |
| 4,107,738 A | 8/1978 | Van Norman | |
| 4,146,799 A | 3/1979 | Pitt et al. | |
| 4,181,845 A | 1/1980 | Bolton | |
| 4,246,604 A | 1/1981 | Hundertmark et al. | |
| 4,249,810 A | 2/1981 | O'Connor et al. | |
| 4,372,658 A | 2/1983 | O'Connor et al. | |
| 4,434,427 A | 2/1984 | Clarke et al. | |
| 4,495,417 A | 1/1985 | Hohensang | |
| 4,517,458 A | 5/1985 | Barringer | |
| 4,542,973 A | 9/1985 | Johnson et al. | |
| 4,560,931 A | 12/1985 | Murakami et al. | |
| 4,607,925 A | 8/1986 | Kamigaichi et al. | |
| 4,612,797 A | 9/1986 | Barkhoudarian | |
| 4,655,607 A | 4/1987 | Kern et al. | |
| 4,656,509 A | 4/1987 | Matsuyama et al. | |
| 4,677,472 A | 6/1987 | Wood | |
| 4,734,766 A | 3/1988 | Shiozumi et al. | |
| 4,772,789 A | 9/1988 | Maram et al. | |
| 4,841,149 A | 6/1989 | Martin et al. | |
| 4,872,762 A | 10/1989 | Koshihara et al. | |
| 4,886,370 A | 12/1989 | Koshihara et al. | |
| 4,913,558 A | 4/1990 | Wettervik et al. | |
| 4,933,678 A | 6/1990 | Tennyson | |
| 4,963,742 A | 10/1990 | Abernathy | |
| 4,983,836 A | 1/1991 | Matoba et al. | |
| 4,988,210 A | 1/1991 | Koshihara et al. | |
| 4,991,006 A | 2/1991 | Wood | |
| 5,001,346 A * | 3/1991 | Barkhoudarian | G01M 3/38 250/330 |
| 5,084,764 A | 1/1992 | Day | |
| 5,090,259 A | 2/1992 | Shishido et al. | |
| 5,148,699 A | 9/1992 | Morse | |
| 5,175,964 A | 1/1993 | Girndt | |
| 5,195,392 A | 3/1993 | Moore et al. | |
| 5,210,526 A | 5/1993 | Imperiali | |
| 5,245,860 A | 9/1993 | Chang et al. | |
| 5,280,530 A | 1/1994 | Trew et al. | |
| 5,281,826 A | 1/1994 | Ivancic et al. | |
| 5,287,133 A | 2/1994 | Bohley | |
| 5,295,201 A | 3/1994 | Yokohama | |
| 5,329,368 A | 7/1994 | Plotke | |
| 5,329,824 A | 7/1994 | Carapezza et al. | |
| 5,333,501 A | 8/1994 | Okada et al. | |
| 5,394,939 A | 3/1995 | Walker | |
| 5,430,293 A | 7/1995 | Sato et al. | |
| 5,457,288 A | 10/1995 | Olsson | |
| 5,461,236 A | 10/1995 | Gram et al. | |
| 5,467,640 A | 11/1995 | Salinas et al. | |
| 5,501,115 A | 3/1996 | Kamiyama et al. | |
| 5,517,427 A | 5/1996 | Joyce | |
| 5,523,569 A * | 6/1996 | Hornfeld | G01M 3/38 250/330 |
| 5,527,169 A | 6/1996 | Goldenberg et al. | |
| 5,537,045 A * | 7/1996 | Henderson | G01M 3/16 324/522 |
| 5,537,336 A | 7/1996 | Joyce | |
| 5,557,277 A | 9/1996 | Tricoles et al. | |
| 5,592,228 A | 1/1997 | Dachiku et al. | |
| 5,592,286 A | 1/1997 | Fedor | |
| 5,615,007 A | 3/1997 | Matsuura et al. | |
| 5,616,854 A | 4/1997 | Berg | |
| 5,617,482 A | 4/1997 | Brusewitz | |
| 5,654,771 A | 8/1997 | Tekalp et al. | |
| 5,672,874 A | 9/1997 | Fujii et al. | |
| 5,708,193 A | 1/1998 | Ledeen et al. | |
| 5,734,167 A | 3/1998 | Skelly | |
| 5,850,285 A | 12/1998 | Hill, Jr. et al. | |
| 5,874,988 A | 2/1999 | Gu | |
| 5,889,199 A | 3/1999 | Wong et al. | |
| 5,939,717 A | 8/1999 | Mullins | |
| 5,974,860 A | 11/1999 | Kuroda et al. | |
| 5,982,909 A | 11/1999 | Erdem et al. | |
| 6,020,918 A | 2/2000 | Murphy | |
| 6,049,281 A | 4/2000 | Osterweil | |
| 6,130,707 A | 10/2000 | Koller et al. | |
| 6,157,033 A | 12/2000 | Chudnovsky | |
| 6,243,483 B1 | 6/2001 | Petrou et al. | |
| 6,312,226 B1 | 11/2001 | Senior, Jr. et al. | |
| 6,314,137 B1 | 11/2001 | Ono et al. | |
| 6,359,645 B1 | 3/2002 | Sivacoe | |
| 6,362,488 B1 | 3/2002 | Cabrera et al. | |
| 6,473,169 B1 | 10/2002 | Dawley et al. | |
| 6,493,041 B1 | 12/2002 | Hanko et al. | |
| 6,514,346 B1 | 2/2003 | Nichols | |
| 6,515,799 B2 | 2/2003 | Ishijima et al. | |
| 6,525,333 B1 | 2/2003 | Hooker et al. | |
| 6,535,639 B1 | 3/2003 | Uchihachi et al. | |
| 6,539,106 B1 | 3/2003 | Gallarda et al. | |
| 6,549,643 B1 | 4/2003 | Toklu et al. | |
| 6,550,499 B1 * | 4/2003 | Pai | F16L 11/12 138/104 |
| 6,553,140 B1 | 4/2003 | Soupliotis et al. | |
| 6,577,333 B2 | 6/2003 | Tai et al. | |
| 6,580,385 B1 | 6/2003 | Winner et al. | |
| 6,621,516 B1 | 9/2003 | Wasson et al. | |
| 6,628,805 B1 | 9/2003 | Hansen et al. | |
| 6,628,831 B1 | 9/2003 | Needham | |
| 6,628,835 B1 | 9/2003 | Brill et al. | |
| 6,646,676 B1 | 11/2003 | DaGraca et al. | |
| 6,650,704 B1 | 11/2003 | Carlson et al. | |
| 6,654,481 B2 | 11/2003 | Amemiya et al. | |
| 6,665,074 B2 | 12/2003 | Huang | |
| 6,680,778 B2 | 1/2004 | Hinnrichs et al. | |
| 6,697,523 B1 | 2/2004 | Divakaran et al. | |
| 6,727,818 B1 | 4/2004 | Wildman et al. | |
| 6,768,115 B2 | 7/2004 | Mikula et al. | |
| 6,771,268 B1 | 8/2004 | Crinon | |
| 6,791,088 B1 | 9/2004 | Williams et al. | |
| 6,812,846 B2 | 11/2004 | Gutta et al. | |
| 6,820,653 B1 | 11/2004 | Schempf et al. | |
| 6,859,285 B1 | 2/2005 | Chang | |
| 6,866,089 B2 | 3/2005 | Avila | |
| 6,870,573 B2 | 3/2005 | Yeo et al. | |
| 6,900,439 B2 | 5/2005 | Komiyama et al. | |
| 6,931,149 B2 | 8/2005 | Hagene et al. | |
| 6,948,258 B2 | 9/2005 | Coulombe et al. | |
| 6,958,683 B2 | 10/2005 | Mills et al. | |
| 6,965,430 B2 | 11/2005 | Kvassheim | |
| 7,009,695 B2 | 3/2006 | Some et al. | |
| 7,016,540 B1 | 3/2006 | Gong et al. | |
| 7,022,993 B1 | 4/2006 | Williams, II et al. | |
| 7,043,964 B1 | 5/2006 | Hickman et al. | |
| 7,046,761 B2 | 5/2006 | Ellenbogen et al. | |
| 7,062,012 B1 | 6/2006 | Chng et al. | |
| 7,110,458 B2 | 9/2006 | Divakaran et al. | |
| 7,127,120 B2 | 10/2006 | Hua et al. | |
| 7,131,344 B2 | 11/2006 | Tarumi | |
| 7,143,352 B2 | 11/2006 | Divakaran et al. | |
| 7,151,852 B2 | 12/2006 | Gong et al. | |
| 7,154,102 B2 | 12/2006 | Poteet et al. | |
| 7,164,476 B2 | 1/2007 | Shima et al. | |
| 7,189,970 B2 | 3/2007 | Racca et al. | |
| 7,214,925 B2 | 5/2007 | Wagoner et al. | |
| 7,289,918 B2 | 10/2007 | Nagase | |
| 7,298,869 B1 * | 11/2007 | Abernathy | G06K 9/0063 324/323 |
| 7,345,757 B2 | 3/2008 | Penza | |
| 7,358,860 B2 * | 4/2008 | Germouni | G01J 5/522 340/603 |
| 7,359,931 B2 | 4/2008 | Tarabzouni et al. | |
| 7,375,814 B2 | 5/2008 | Reichardt et al. | |
| 7,381,972 B1 | 6/2008 | Varmette et al. | |
| 7,382,895 B2 | 6/2008 | Bramblet et al. | |
| 7,385,681 B2 | 6/2008 | Ninomiya et al. | |
| 7,421,461 B2 | 9/2008 | Prokop et al. | |
| 7,460,980 B2 | 12/2008 | Hinn | |
| 7,468,520 B1 | 12/2008 | Varmette et al. | |
| 7,486,399 B1 | 2/2009 | Reichardt et al. | |
| 7,505,063 B1 | 3/2009 | Bastedo et al. | |
| 7,616,782 B2 | 11/2009 | Badawy | |

(56) References Cited

U.S. PATENT DOCUMENTS

| | | | |
|---|---|---|---|
| 7,618,603 B2 | 11/2009 | Seames et al. |
| 7,639,840 B2 | 12/2009 | Hanna et al. |
| 7,645,992 B2 | 1/2010 | Lyubchik et al. |
| 7,649,174 B2 | 1/2010 | Mammen et al. |
| 7,665,346 B1 | 2/2010 | Stauffer et al. |
| 7,669,614 B2 | 3/2010 | Cohen |
| 7,675,029 B2 | 3/2010 | Ramstad et al. |
| 7,888,941 B2 | 2/2011 | San Martin et al. |
| 7,896,073 B2 | 3/2011 | Forgang et al. |
| 7,916,170 B2 | 3/2011 | Soltysik et al. |
| 7,918,126 B2 | 4/2011 | McStay et al. |
| 7,939,804 B2 | 5/2011 | Schmidt |
| 7,940,297 B2 | 5/2011 | Penza et al. |
| 7,961,906 B2 | 6/2011 | Ruedin |
| 7,969,470 B2 | 6/2011 | Kishida |
| 8,004,415 B2 | 8/2011 | Boss et al. |
| 8,124,931 B2 | 2/2012 | Andrews et al. |
| 8,150,201 B2 | 4/2012 | Kasai et al. |
| 8,254,625 B2 | 8/2012 | Coulter et al. |
| 8,260,052 B1* | 9/2012 | Scannell | G06K 9/6293 342/90 |
| 9,020,261 B2 | 4/2015 | Lipton et al. |
| 9,021,006 B2 | 4/2015 | Myers et al. |
| 9,158,975 B2 | 10/2015 | Lipton et al. |
| 9,165,190 B2 | 10/2015 | Zhang et al. |
| 9,195,883 B2 | 11/2015 | Brewer et al. |
| 9,204,107 B2 | 12/2015 | Yin et al. |
| 9,219,889 B2 | 12/2015 | Myers et al. |
| 9,240,051 B2 | 1/2016 | Liu et al. |
| 9,247,211 B2 | 1/2016 | Zhang et al. |
| 2002/0044054 A1 | 4/2002 | Krubiner et al. |
| 2002/0067259 A1 | 6/2002 | Fufidio et al. |
| 2002/0179300 A1 | 12/2002 | Gay et al. |
| 2003/0010345 A1 | 1/2003 | Koblasz et al. |
| 2003/0010918 A1 | 1/2003 | Komiyama et al. |
| 2003/0063006 A1* | 4/2003 | Gutta | G01N 21/8803 340/603 |
| 2003/0072004 A1 | 4/2003 | Huang |
| 2003/0076417 A1 | 4/2003 | Thomas et al. |
| 2003/0086091 A1 | 5/2003 | Hinnrichs et al. |
| 2003/0128125 A1* | 7/2003 | Burbank | A61M 1/3656 340/605 |
| 2004/0003914 A1 | 1/2004 | Avila |
| 2004/0061781 A1 | 4/2004 | Fennell et al. |
| 2004/0122602 A1 | 6/2004 | Nagase |
| 2004/0263852 A1* | 12/2004 | Degtiarev | G01M 3/38 356/437 |
| 2005/0058321 A1 | 3/2005 | Buehler |
| 2005/0126263 A1 | 6/2005 | Avila |
| 2005/0131646 A1 | 6/2005 | Camus |
| 2005/0156111 A1 | 7/2005 | Racca et al. |
| 2005/0160794 A1 | 7/2005 | Sonntag et al. |
| 2006/0091310 A1 | 5/2006 | Furry |
| 2006/0093212 A1 | 5/2006 | Steinberg et al. |
| 2006/0115110 A1 | 6/2006 | Rodriguez et al. |
| 2006/0126785 A1 | 6/2006 | Chng et al. |
| 2006/0155194 A1 | 7/2006 | Marcotte et al. |
| 2006/0203248 A1 | 9/2006 | Reichardt et al. |
| 2006/0220888 A1 | 10/2006 | Germouni et al. |
| 2006/0238741 A1 | 10/2006 | Ninomiya et al. |
| 2007/0000310 A1* | 1/2007 | Yamartino | G01M 3/226 73/40.7 |
| 2007/0018104 A1 | 1/2007 | Parvin et al. |
| 2007/0033170 A1 | 2/2007 | Sull et al. |
| 2007/0040121 A1* | 2/2007 | Kalayeh | G01C 11/025 250/342 |
| 2008/0069177 A1 | 3/2008 | Minor et al. |
| 2008/0092625 A1 | 4/2008 | Hinnrichs |
| 2008/0144885 A1 | 6/2008 | Zucherman et al. |
| 2008/0203332 A1* | 8/2008 | McStay | G01N 21/8507 250/553 |
| 2008/0231719 A1 | 9/2008 | Benson et al. |
| 2008/0285840 A1 | 11/2008 | Kawai |
| 2009/0056949 A1 | 3/2009 | McStay et al. |
| 2009/0200466 A1 | 8/2009 | Mammen et al. |
| 2009/0313187 A1* | 12/2009 | Miller | G06F 17/30539 706/11 |
| 2010/0127173 A1 | 5/2010 | Schmidt |
| 2010/0158330 A1 | 6/2010 | Guissin et al. |
| 2010/0177247 A1 | 7/2010 | Sekulovski et al. |
| 2010/0211333 A1 | 8/2010 | Pruet et al. |
| 2010/0284570 A1 | 11/2010 | Grimberg |
| 2011/0018996 A1 | 1/2011 | Mian et al. |
| 2011/0075923 A1 | 3/2011 | Imai |
| 2011/0087444 A1 | 4/2011 | Volker |
| 2011/0101225 A1 | 5/2011 | Alawadi |
| 2011/0185790 A1 | 8/2011 | Choi et al. |
| 2011/0185791 A1 | 8/2011 | van Staden |
| 2011/0215936 A1* | 9/2011 | Ansari | G01M 3/002 340/584 |
| 2011/0267464 A1* | 11/2011 | Archer | G08B 13/19656 348/143 |
| 2012/0045090 A1 | 2/2012 | Bobbitt et al. |
| 2012/0068851 A1 | 3/2012 | Jarrier et al. |
| 2012/0087573 A1 | 4/2012 | Sharma et al. |
| 2012/0150333 A1* | 6/2012 | De Luca | G06K 9/00771 700/109 |
| 2012/0268594 A1 | 10/2012 | Haering et al. |
| 2012/0269430 A1 | 10/2012 | Deskevich et al. |
| 2013/0066568 A1 | 3/2013 | Alonso |
| 2013/0335579 A1 | 12/2013 | Raghavan et al. |
| 2014/0050355 A1* | 2/2014 | Cobb | G06K 9/00664 382/103 |
| 2014/0064553 A1* | 3/2014 | Knauth | G06K 9/00771 382/103 |
| 2014/0193065 A1* | 7/2014 | Chu | G06T 7/0004 382/149 |
| 2014/0210984 A1 | 7/2014 | Warwick et al. |
| 2014/0278552 A1 | 9/2014 | Hold |
| 2014/0279733 A1* | 9/2014 | Djugash | G06N 99/005 706/12 |
| 2014/0340502 A1* | 11/2014 | Freeman | G06T 7/20 348/79 |
| 2014/0368347 A1* | 12/2014 | White | G01W 1/02 340/601 |
| 2015/0178949 A1 | 6/2015 | Ren et al. |
| 2015/0292976 A1 | 10/2015 | Xu et al. |
| 2015/0317787 A1 | 11/2015 | Badawy et al. |

FOREIGN PATENT DOCUMENTS

| | | |
|---|---|---|
| CA | 1306776 C | 8/1992 |
| CA | 1307839 C | 9/1992 |
| CA | 2117345 A1 | 7/1993 |
| CA | 2066578 C | 12/1998 |
| CA | 2176065 C | 1/2000 |
| CA | 2155136 C | 12/2001 |
| CA | 2416171 A1 | 7/2004 |
| CA | 2528299 A1 | 1/2005 |
| CA | 2509436 A1 | 12/2006 |
| CA | 2 277 713 C | 10/2009 |
| CA | 2 719 398 A1 | 10/2009 |
| CA | 2 437 496 C | 8/2010 |
| CA | 2 518 491 C | 11/2011 |
| CA | 2 670 571 C | 5/2012 |
| CA | 2 466 247 A1 | 7/2013 |
| CA | 2 826 115 A1 | 3/2014 |
| CN | 101846576 A | 9/2010 |
| CN | 101846576 B | 12/2011 |
| EP | 1486928 A2 | 12/2004 |
| JP | 2013-101474 A | 5/2013 |
| WO | 2005/087590 A1 | 9/2005 |

OTHER PUBLICATIONS

Zhou, P., et al., "Detection of Underground Petroleum Pipeline With Infrared Imaging Method," Acta Petrolei Sinica 27(5):127-130, 2006 [abstract].

Amer, A., et al., "A Real-Time System for High-Level Video Representation: Application to Video Surveillance," Proceedings of

(56) References Cited

OTHER PUBLICATIONS

SPIE—The International Society for Optical Engineering 5022(1):530-541, May 2003 (12 pages).
Badawy, W., and M. Bayoumi, "Algorithm-Based Low-Power VLSI Architecture for 2-D Mesh Video-Object Motion Tracking," IEEE Transactions on Circuits and Systems for Video Technology 12(4):227-237, Apr. 2002.
Badawy, W., and M. Bayoumi, "On Minimizing Hierarchical Mesh Coding Overhead: (HASM) Hierarchical Adaptive Structured Mesh Approach," Proceedings of the IEEE International Conference on Acoustics, Speech, and Signal Processing, Istanbul, Jun. 2000, vol. 4, pp. 1923-1926.
Badawy, W., and M.A. Bayoumi, "A Low Power VLSI Architecture for Mesh-Based Video Motion Tracking," IEEE Transactions on Circuits and Systems II: Analog and Digital Signal Processing 49(7):488-504, Jul. 2002.
Badawy, W., et al., "VLSI Architecture for Hierarchical Mesh Based Motion Estimation," 1999 IEEE Workshop on Signal Processing Systems: Design and Implementation, Taipei, Oct. 20-22, 1999 [abstract].
Badawy, W., "Low-Power Architectures for Video-Object Coding With Low Bit-Rate Applications," doctoral dissertation, University of Louisiana at Lafayette, Spring 2000, 139 pages [abstract].
Baykal, I.C., and G. A. Jullien, "Detection of Defects in Textures With Alignment Error for Real-Time Line-Scan Web Inspection Systems," IEEE Midwest Symposium on Circuits and Systems, Oklahoma State University, Stillwater, Oklahoma, Aug. 4-7, 2002, pp. 292-295.
Baykal, I.C., et al., "On the Use of Hash Function for Defects Detection in Textures for In-Camera Web Inspection Systems," Proceedings of the IEEE International Symposium on Circuits and Systems, Scottsdale, Ariz., May 26-29, 2002, vol. 5, pp. 665-668.
Bevilacqua, A., and M. Roffilli, "Robust Denoising and Moving Shadows Detection in Traffic Scenes," Proceedings of the Computer Society Conference on Computer Vision and Pattern Recognition, Kauai, Hawaii, Dec. 9-14, 2001, pp. 1-4.
Birchfields, S., "An Elliptical Head Tracker," 31st Asilomar Conference on Signals, Systems and Computers, Pacific Grove, Calif., Nov. 2-5, 1997, 5 pages.
Birchfields, S., "Elliptical Head Tracking Using Intensity Gradients and Color Histograms," Proceedings of the IEEE Conference on Computer Vision and Pattern Recognition, Santa Barbara, Calif., Jun. 23-25, 1998, pp. 232-237.
Bobick, A. F., et al., "The KidsRoom: A Perceptually-Based Interactive and Immersive Story Environment," Technical Report 398, M.I.T Perceptual Computing, Nov. 1996, revised Jun. 1998, 20 pages; also appears in Presence: Teleoperators and Virtual Environments 8(4):367-391, Aug. 1999.
Brofferio, S., and F. Rocca, "Interframe Redundancy Reduction of Video Signals Generated by Translating Objects," IEEE Transactions on Communications 25(4):448-455, Apr. 1977 [abstract].
Han, J., and B. Bhanu, "Detecting Moving Humans Using Color and Infrared Video," Proceedings of the IEEE Conference on Multisensor Fusion and Integration for Intelligent Systems, Tokyo, Jul. 30-Aug. 1, 2003, pp. 228-233.
Ivanov, Y., et al., "Tracking People in Mixed Modality Systems," Proceedings of SPIE 6508, Visual Communications and Image Processing 2007, San Jose, Jan. 28, 2008, 11 pages.
Jadin, M.S., and K.H. Ghazali, "Gas Leakage Detection Using Thermal Imaging Technique," 2014 UKSim-AMSS 16th International Conference on Computer Modelling and Simulation, Cambridge, U.K., Mar. 26-28, 2014, pp. 302-306.
Landabaso, J.-L., et al., "Shadow Removal With Morphological Reconstruction," Proceedings of Jornades de Recerca en Automàtica, Visió i Robòtica (AVR), Barcelona, 2004, 5 pages.
Lewis, J.P., "Fast Normalized Cross-Correlation," Vision Interface 10(1):120-123, 1995.

Li, B., and M.I. Sezan, "Event Detection and Summarization in Sports Video," Proceedings of the IEEE Workshop on Content-Based Access of Image and Video Libraries (CBAIVL '01), Dec. 14, 2001, pp. 132-138 [abstract].
Lipton, A., et al., "Moving Target Detection and Classification From Real-Time Video," Proceedings of the Fourth IEEE Workshop on Applications of Computer Vision (WACV '98), Princeton, N.J., Oct. 19-21, 1998, pp. 8-14 [abstract].
Lu, S., et al., "A Novel Video Summarization Framework for Document Preparation and Archival Applications," Proceedings of the 2005 IEEE Aerospace Conference, Big Sky, Mont., Mar. 5-12, 2005, pp. 1-10.
Manku, G.S., et al., "Object Tracking Using Affine Structure for Point Correspondences," Proceedings of the IEEE Conference on Computer Vision and Pattern Recognition, Puerto Rico, Jun. 17-19, 1997, 6 pages.
Ngo, C., et al., "Video Partitioning by Temporal Slice Coherency," IEEE Transactions on Circuits and Systems for Video Technology 11(8):941-953, Aug. 2001.
"Operator's Manual: FinishLynx 32," Lynx System Developers, Inc., Haverhill, Mass., Sep. 20, 2001, <http://www.finishlynx.com>, 202 pages.
Reid, I.D., and D.W. Murray, "Active Tracking of Foveated Feature Clusters Using Affine Structure," International Journal of Computer Vision 18:41-60, 1996.
Reid, I.D., and D.W. Murray, "Tracking Foveated Corner Clusters Using Affine Structure," Proceedings of the IEEE International Conference on Computer Vision, Berlin, May 11-14, 1993, pp. 76-83 [abstract].
Ruff, T., "Feasibility of Using Intelligent Video for Machine Safety Applications," Proceedings of the IEEE Industry Applications Society Annual Meeting (IAS '08), Edmonton, Alberta, Canada, Oct. 5-9, 2008, pp. 15.
Russell, D.M., "A Design Pattern-Based Video Summarization Technique: Moving From Low-Level Signals to High-Level Structure," Proceedings of the 33rd Annual Hawaii International Conference on System Sciences, Maui, Hawaii, Jan. 4-7, 2000, pp. 1-5.
Salvador, E., et al., "Cast Shadow Segmentation Using Invariant Color Features," Computer Vision and Image Understanding 95(2):238-259, Aug. 2004.
Shi, L., et al., "Texture Feature Application in Oil Spill Detection by Satellite Data," Congress on Image and Signal Processing (CISP '08), Sanya, China, May 27-30, 2008, pp. 784-788 [abstract].
Sidenbladh, H., "Detecting Human Motion With Support Vector Machines," Proceedings of the 17th IAPR International Conference on Pattern Recognition, Cambridge, U.K., Aug. 23-26, 2004, vol. 2, pp. 188-191.
Tian, Y., "S3-R1: The IBM Smart Surveillance System Release 1," Proceedings of the 14th Annual International Conference on Wireless and Optical Communications (WOCC 2005), Newark, N.J., Apr. 22-23, 2005 [abstract].
Tian, Y., et al., "Robust Salient Motion Detection With Complex Background for Real-time Video Surveillance," Motion and Video Computing 2:30-35, 2005.
Toklu, C., et al., "Tracking Motion and Intensity Variations Using Hierarchical 2-D Mesh Modeling for Synthetic Object Transfiguration," Graphical Models and Image Processing 58(6):553-573, Nov. 1996 [abstract].
Tuzel, O., et al., "Human Detection via Classification on Riemannian Manifolds," Proceedings of the IEEE Conference on Computer Vision and Pattern Recognition (CVPR '07), Minneapolis, Jun. 17-22, 2007, pp. 1-8.
Vilaplana, V., et al., "Region-Based Segmentation and Tracking of Human Faces," Proceedings of the 9th European Signal Processing Conference (EUSIPCO 1998), Rhodes, Sep. 8-11, 1998, pp. 311-314.
Wang, Y., and O. Lee, "Active Mesh—A Feature Seeking and Tracking Image Sequence Representation Scheme," IEEE Trans. On Image Processing, vol. 3, No. 5, pp. 610-624, 1994 [abstract].
Wang, Y., et al., "Use of Two-Dimensional Deformable Mesh Structures for Video Coding. II. The Analysis Problem and a Region-Based Coder Employing an Active Mesh Representation,"

(56) References Cited

OTHER PUBLICATIONS

IEEE Transactions on Circuits and Systems for Video Technology 6(6):647-659, Dec. 1996 [abstract].

Wei, Y., and W. Badawy, "A Novel Zoom Invariant Video Object Tracking Algorithm (ZIVOTA)," Proceedings of the IEEE Canadian Conference on Electrical and Computer Engineering (CCECE), Montréal, May 4-7, 2003, vol. 2, pp. 1191-1194 [abstract].

Extended European Search Report dated Jan. 2, 2017, issued in related European Application No. EP 14 79 1064, filed Apr. 29, 2014, 8 pages.

"IEEE UKSim 2014: UKSim-AMSS 16th International Conference on Modelling and Simulation," Institute of Electrical and Electronics Engineers, Cambridge University, Cambridge, U.K., Mar. 26-28, 2014, <http://uksim.info/uksim2014/uksim2014.htm#Papers> [retrieved Jul. 15, 2015], 18 pages.

Koschan, A., and M. Abidi, "Detection and Classification of Edges in Color Images," IEEE Signal Processing Magazine 22(1):64-73, Jan. 2005.

Saravanan, C., "Color Image to Grayscale Image Conversion," 2010 Second International Conference on Computer Engineering and Applications, Mar. 19, 2010, pp. 196-199.

\* cited by examiner

OBJECT DETECTION

TECHNICAL FIELD

Object detection.

BACKGROUND

A variety of leak detection methods are known, including those described in U.S. Pat. Nos. 4,772,789; 4,963,742; 5,001,346; 5,210,526; 6,812,846 and 7,460,980.

SUMMARY

The inventors have disclosed a new apparatus for object detection, including leak and bird detection.

There is thus provided an object detection apparatus, comprising a camera having video output comprising frames; and a digital video processor configured to receive the video output from the camera, detect and track a blob in the frames to determine a trajectory for the blob and trigger an alert message if the trajectory of the blob is characteristic of the object to be detected. The digital video processor may detect and classify the candidate object as a leak, and provide an alert or alarm. The digital video processor may detect and classify the candidate object as a bird, and provide a bird report. There may also be provided a weather station and the digital video processor being configured to receive input from the weather station and take the input from the weather station into account in determining whether to trigger an alert. The digital video processor carries out the disclosed detection methods.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
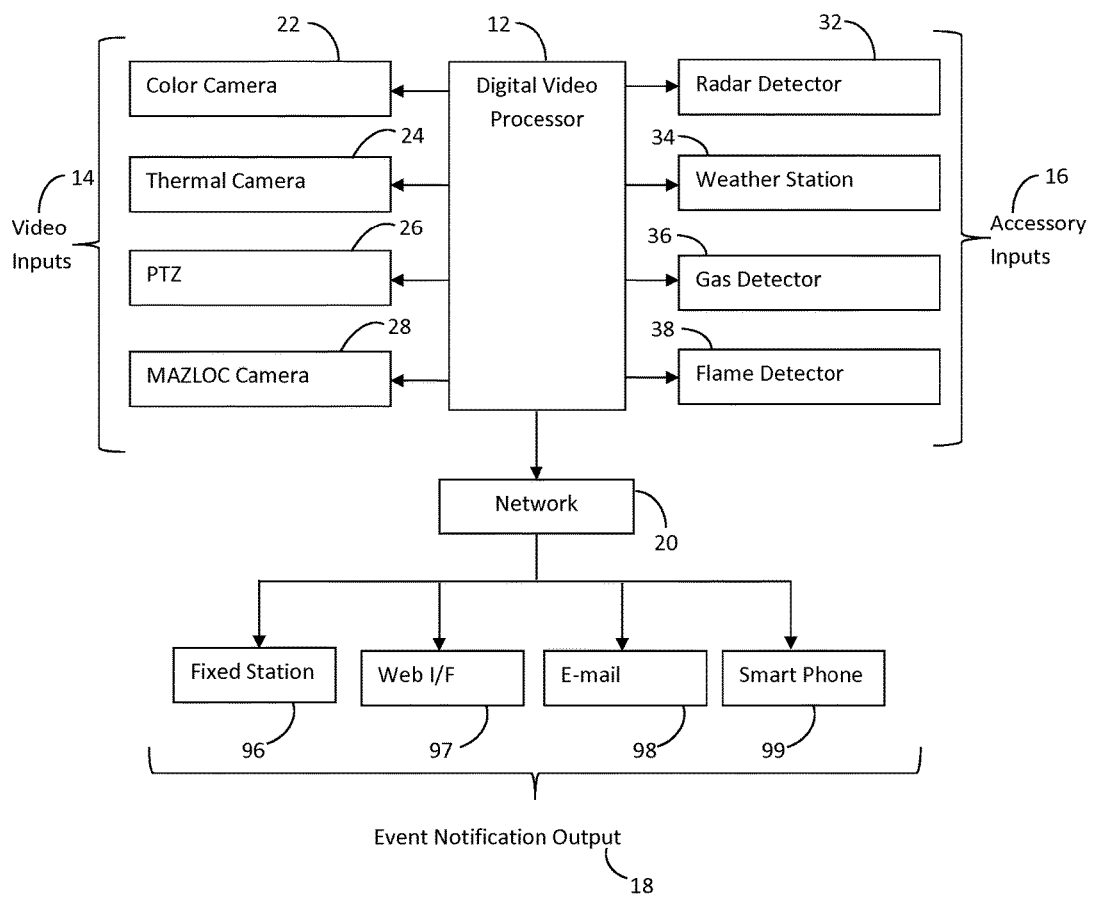
FIG. 1 is a schematic showing a leak detection system.

Immaterial modifications may be made to the embodiments described here without departing from what is covered by the claims. Referring to FIG. 1, there is shown a leak detection apparatus 10 comprising a digital video processor (DVP) 12, one or more video inputs 14 connected to output frames of video to the DVP 12, one or more accessory inputs 16 connected to output sensor signals to the DVP 12, and event notification outputs 18 that may be connected directly or indirectly, for example through a network 20 such as the internet, to receive alert messages from the DVP 12. The video inputs 14 may comprise one or more of a color camera 22 such as a Day/Night Color Camera IVT-LIT90ESHQ, a thermal camera 24 such as Thermal Camera IVT-XWTA-19, pan-tilt-zoom camera 26 such as a conventional security camera, and hazardous location camera 28 such as Day/Night Hazardous Location Camera IVT-C1D190ESHQ.

The accessory inputs 16 may comprise one or more of a radar detector 32, weather station 34, gas detector 36 and flame detector 38. The inputs 14 and 16 may be conventional commercially available products. The DVP 12 may comprise a digital video recorder, with built in or added encoder, having digital video processing circuitry or a digital video recorder combined with separate encoder and processor. The DVP 12 may comprise conventional digital video recording and processing hardware, configured with software for carrying out the functions disclosed here to receive frames of video output from one or more of the video inputs 14, detect and track a blob in the frames to determine a trajectory for the blob and trigger an alert message if the trajectory of the blob is characteristic of a leak. For example, the DVP 12 may comprise a SmrtDVR IVT-DVR405-05 4Ch DVR.

The camera 22, 24, 26 and/or 28 may be connected via 75 ohm BNC (RG 59U/RG 6) cable or other suitable communication link to the DVP 12. An exemplary DVP 12 may be equipped with a H.264 hardware encoder, capable of encoding analog video feed up to a maximum of 4CIF (704×480) resolution at 30 fps. Baseline profile is used with a quality settings of 30 and GOV settings of 5. Leak analytic preferably uses two cameras; one thermal 24 and one color 22. The thermal camera 24 is preferably the one in which the algorithm runs for leak detection. The color camera 22 or other cameras 26, 28 are preferably used for visual reference and verification. The analysis may for example be done on raw frame buffer (YUV) of CIF (352×240) resolution at 10 fps. The video may for example be recorded in H.264 compressed format of which resolution and frame rate are user selectable. In the exemplary embodiment, supported resolutions and frame rates for recorder video are CIF/2CIF/4CIF and 5/10/15/30 fps, respectively, but this will change as standards and available equipment change.

Figure 2:
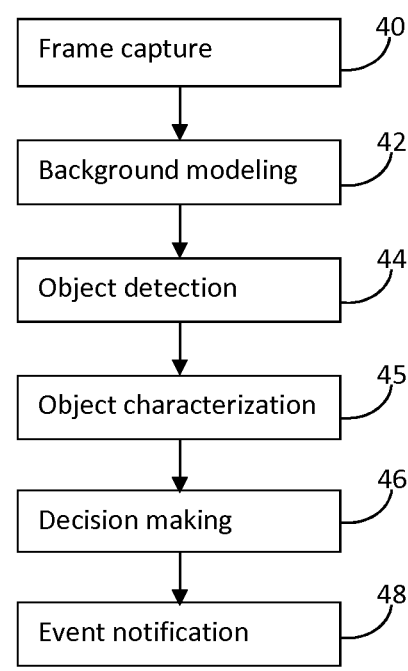
FIG. 2 is a high level flow diagram of a leak detection algorithm.
Figure 3:
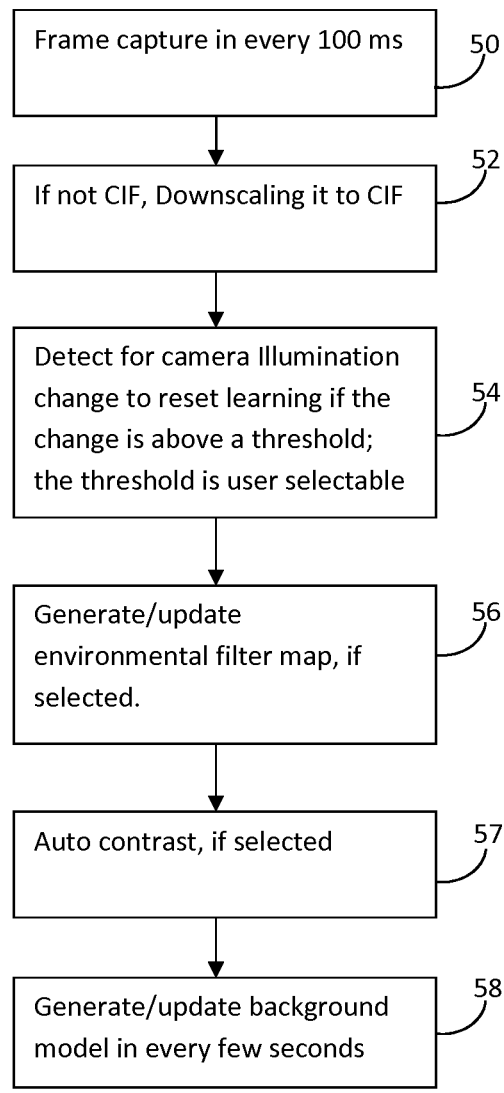
FIG. 3 is a flow diagram of frame capture and background modeling.

As illustrated in FIG. 2, following frame capture 40, the leak detection algorithm goes through a series of stages comprising background modeling 42, object detection 44, object characterization 45, decision making 46 and event notification 48. Background modeling 41 is carried out as a precursor to the object identification process and includes a learning process when first initiated. The frame capture and background modeling stage is shown in FIG. 3 in the following steps: 50 a frame is captured at a time rate dependent on the hardware, 52 frame processing, again hardware dependent, but in this example to ensure the frame is downscaled to a Common Intermediate Format (CIF) if not already CIF, 54 check camera illumination, if this requires changing, reset learning process if change is a above a user selectable threshold, 56 generate or update an environmental filter map, if selected, 57 adjust or set auto contract and 58 generate or update the background model from time to time, such as every few seconds. The environmental filter step 58 may be obtained from data from an accessory input such as a weather station 34 to filter out effects of weather, such as glare, rain or snow.

Figure 4:
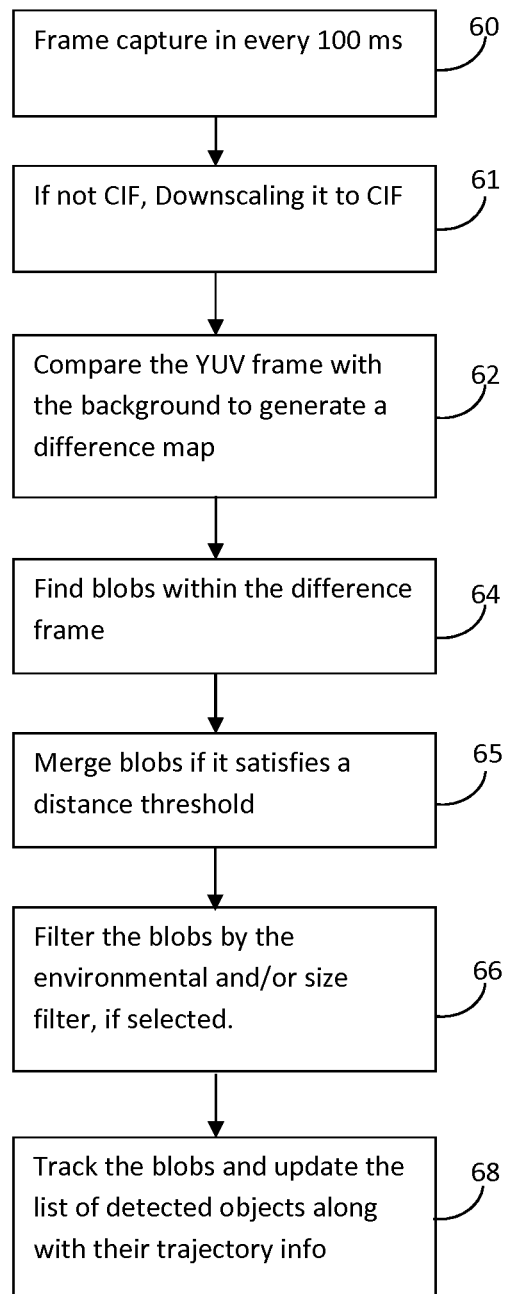
FIG. 4 is a flow diagram of object detection.

An exemplary object detection and characterization process is shown in FIG. 4, and includes the following steps: 60 a frame is captured at a time rate dependent on the hardware, 61 frame processing, again hardware dependent, but in this example to ensure the frame is downscaled to a Common Intermediate Format (CIF) if not already CIF, 62 a frame from the thermal camera 24, such as a YUV encoded frame (though other formats may be used), is compared with the background to generate a difference map, 64 blobs within the difference frame are detected by any one of a variety of conventional digital image processing methods, 65 merge blobs if the distance between blobs (x-y pixel distance for example), satisfies a user set distance threshold, 66 filter the blobs for environmental and/or size effects (as for the background to remove for example weather effects) and 68 track the blobs to determine their trajectory and update a list of blobs with the tracking information, including an identification code for each blob and the trajectory information associated with the blob. Blob detection may use HASM as disclosed in "A low power VLSI architecture for mesh-based video motion tracking," Badawy, W., and Bayoumi, M. A., IEEE Transactions on Circuits and Systems II: Analog and Digital Signal Processing, Vol. 49, Issue 7, pp. 488-504, July 2002; and also in "On Minimizing Hierarchical Mesh Coding Overhead: (HASM) Hierarchical Adaptive Structured Mesh Approach," Badawy, W., and Bayoumi, M., Proc. IEEE Int. Conf. Acoustics, Speech and Signal Processing, Istanbul, Turkey, June 2000, pp 1923-1926; and "Algorithm Based Low Power VLSI Architecture for 2-D mesh Video-Object Motion Tracking", IEEE Transactions on Circuits and Systems for Video Technology, Vol. 12, No. 4, April 2002 and U.S. Pat. No. 7,986,810.

In the detection and tracking process of FIG. 4, blobs are detected as each new frame is compared and analyzed with the background model to find the difference. The blobs may be detected as blob rectangles (set of x-y pixel coordinates forming a rectangle) or other polygons. These blob rectangles are further analyzed in order to combine together to form an object. This is done in order to interpret one physical object just by one object and not by multiple smaller objects.

The object characterization depends on the analytic. For leak analytic the object characterization factors (leak criteria) are: Object has to appear first inside the area of interest. Object cannot appear outside the area of interest and move inside. Object can disappear in the next frame but can reappear in the following frame. Object must not move beyond a defined boundary from where it first appeared in the frame. Object has to be within the area of interest in the successive frames before the leak alarm is set off. Objects may be characterized as leaks, drips, sprays and pools.

Figure 5:
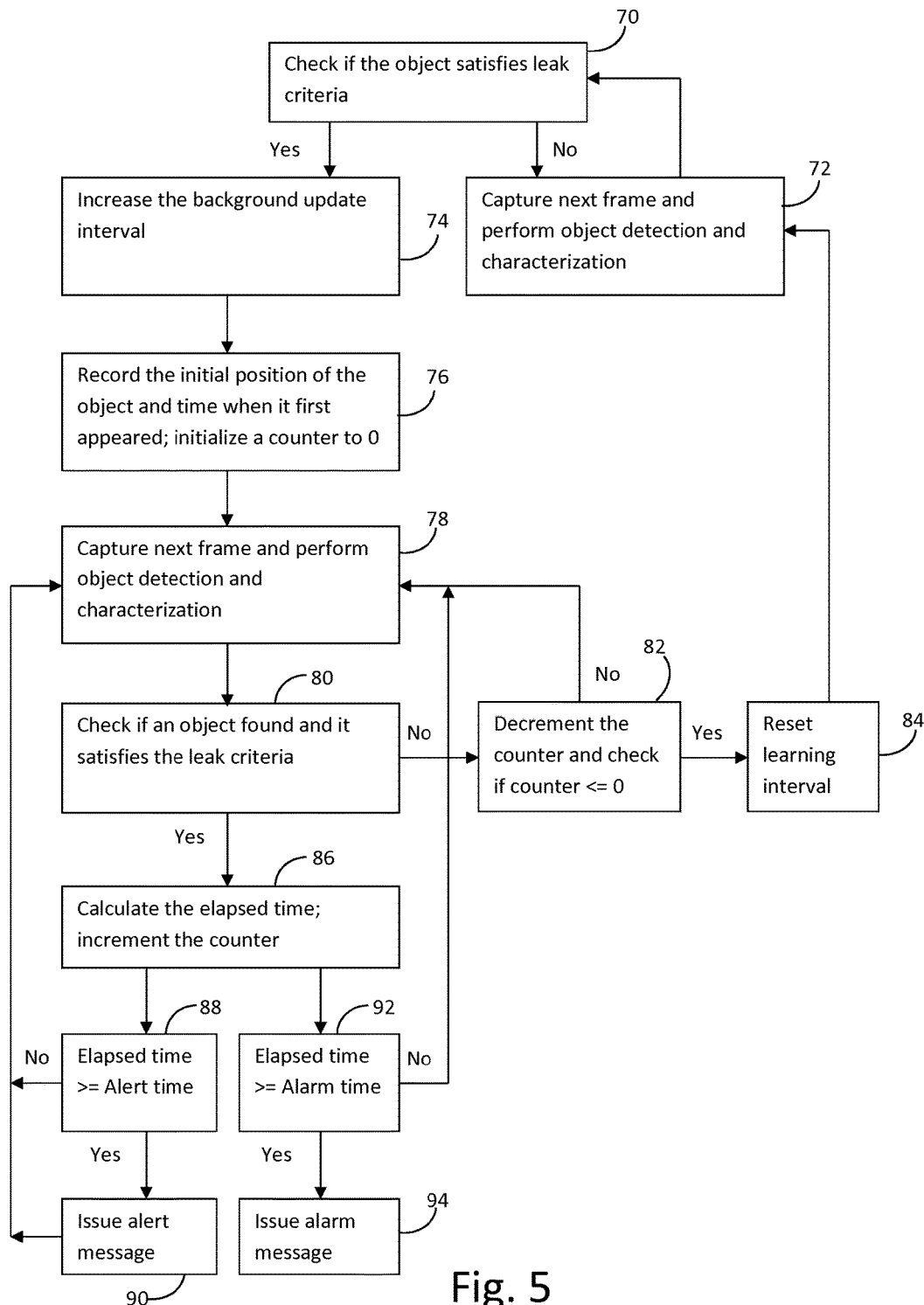
FIG. 5 is a flow diagram of object characterization and decision making.

The decision making algorithm depends on two user defined parameters: Time to Alert and Time to Alarm. "Time to Alert" is the time that the algorithm waits for until it sets off an "Alert" to warn the user. The alert basically indicates that there is a potential leak. "Time to Alarm" is the time till when the algorithm waits before it turns the "Alert" into "Alarm" state. The algorithm is shown in FIG. 5. The counter is linear when incrementing and non-linear when decrementing. Its decay rate increases while decrementing. Thus, as shown in FIG. 5, the decision making algorithm follows these steps: 70 check if the candidate object satisfies leak criteria, 72 if no, capture next frame and perform object detection and characterization, 74, if yes, increase the background update interval, 76 record the initial position of the blob (candidate object) and time when it first appeared, initialize a counter to zero, 78 capture a next frame (does not have to be the next frame, depending on frame rate and desired sensitivity) and perform object detection and characterization as in FIG. 4, 80 check if a candidate object is found and it satisfies the leak criteria, 82 if no candidate object found that satisfies leak criteria, decrement the counter and check if counter less than or equal to zero, and if no again, return to step 78, and if counter is less than or equal to zero, then step 84 reset learning interval and return to step 72, if a candidate object is found and it satisfies leak criteria in step 80, then 86 calculate the elapsed time since the candidate object first appeared, 88 if the elapsed time is greater than or equal to an alert time (first threshold) issue an alert message 90 otherwise return to step 78, and 92 if the elapsed time is greater than the alarm time (second threshold) issue an alarm message otherwise return to step 78. A leak is therefore characterized, and an alert or alarm triggered, if it meets the criteria and persists after its initial appearance as a leak.

For event notification, in the event of an alert or alarm the system can be programmed to send the notification to the user in several ways. System can send the notification to a central monitoring station 96, to email 98 or to a handheld smart phone 99 with mobile app. The events can also be viewed through web browser 97 (for example Internet Explorer/Chrome) by logging into the DVP 12. The notification contains alert/alarm event message and may include snapshots from the thermal camera 24 and color camera 22 (if equipped) or other camera 26, 28. System can also be programmed to set off a buzzer or siren through its digital IO interface or even send notification to SCADA system through RTU/MODBUS interface.

When an alarm occurs, or at other times, the system 10 may use the thermal camera 24 or one of the other video inputs 14 to capture and store an image of the field of view of the thermal camera 24. The system 10 is preferably self-contained and able to operate on localized power when available, or equipped with its own power source such as battery, diesel generator, solar, wind or fuel cell. In hazardous location applications, the system 10 should be installed in approved enclosures, such as Class 1 Division 1 and Division 2 enclosures, and built to withstand extreme temperatures. Video from any of the inputs 14 may be stored in the DVP 12 for one touch playback and instant video tagging. DVP 12 may be connected to monitor hundreds of cameras and devices as well as providing leak detection, color matching, security analysis and more in a few rack mountable devices. Camera coverage varies by type and application, but may for example be placed from 5 m to 150 m from the target area.

Current thermal camera technology requires a temperature difference of 5 degrees C. for the camera to distinguish between objects. When external temperatures match the temperature of the product in a pipeline (5 degrees plus/minus), the detection system will not be able to detect leaks. To resolve this, the DVP 12 can accept a communications input from the operator of the equipment being monitored, such as a Modbus or other Scada input, to indicate product temperature and the Weather Station 34 can be used to indicate ambient temperature. When the DVP 12 sees an ambient thermal match, it can be programmed to send notifications and periodic images using the color camera 22 for visual verification to a monitoring station 96.

In a blizzard, the thermal camera 24 cannot "see" the target area. Using the weather station 34 as an input to the DVP 12, the DVP 12 may send notifications and periodic images using the color camera 22 for visual verification to a monitoring station 96. High winds can cause movement in masts and poles and cause false alarms. Guy wires are recommended whenever possible to secure the supports for the inputs 14. DVP 12 when operated with a thermal camera 24 as the primary source of leak detection information may cause an alarm if personnel are within the field of view of the thermal camera 24. Alert and Alarm delays programmed into the solution are used to ignore personnel and vehicles passing through the area. However, at times, personnel will be required to stay within the area of interest and due to this, will initiate an alarm. To resolve this, a switch may be installed that can disable the operation of the DVP 12 while personnel are onsite. Once finished, personnel can switch the DVP 12 back on, or the DVP 12 can be programmed to restart automatically after a certain time period.

In normal operation, the thermal sensor 24 is able to pick up the thermal signature of a fluid spray or flow emanating from an enclosed space that would typically have a different temperature than the outdoor conditions. During day time, the color camera 22 may optionally be used as a visual reference to detect the oil or liquid accumulation over a surface. The DVP 12 can also use the color camera 22 to take snapshots of the scene to periodically send to the user for visual verification of operation. The snapshots can be sent to a remote monitoring station 96 or as email attachments 98 via the user's own network, 3G Cellular, or via a satellite communication solution.

Depending on the type of pipeline or vessel is being monitored and what is being transported through the pipe or stored in the vessel, characteristics of a spill could vary significantly. A combination of thermal 24 and video cameras 22 may be key to successfully identifying leaks. This way, temperature differences can be used to accurately identify leaks or spills through analysis, and color and size characteristics can be used for manual verification.

When using thermal camera 24, heat is the major deciding factor for detecting a pipeline leak. For the system 10 to be the most effective in monitoring a pipeline, it should be setup along the critical points of the pipeline. Ideally, the setup is mounted 30 feet (10 meters) above the ground so that the cameras scan the area below allowing the video analytics software to detect any scene anomalies that may result from liquid spills, sprays, leaks, or pools. Both the color camera 22 and the thermal camera 24 are used in conjunction to improve detection during day time and night time. The video image must have a clear picture with no noise interference for the camera or other input 14 to accurately monitor the area and detect pipeline leaks effectively. Preferably, the pipeline or other vessel should cover a minimum of 20% of the thermal camera's field of view. This means that the camera should be setup so that 20% of the image is taken up by the pipeline or other vessel. The camera can be up to 150 meters away from the furthest part of the pipeline and will effectively cover at least 30 meters of pipeline. To make an accurate detection from an image with a field of view of 240×320 pixels, 256 pixels must show a temperature difference. This means that a spray taking up 0.34% of the image will be able to be detected.

Detection area depends on equipment used, but the following chart illustrates the detection area at different distances with a 19 mm and 60 mm camera for example.

| | Lens Type | | | |
|---|---|---|---|---|
| | 19 mm | | 60 mm | |
| Distance from Camera (m) | Coverage Area (m2) | Minimum Detection Area (m2) | Coverage Area (m2) | Minimum Detection Area (m2) |
| 5 | 3.61 | 0.0030 | | |
| 25 | 90.41 | 0.0753 | | |
| 50 | 361.66 | 0.3014 | 33.29 | 0.0277 |
| 75 | 813.73 | 0.6781 | 74.91 | 0.0624 |
| 100 | 1446.64 | 1.21 | 133.18 | 0.1110 |
| 125 | 2260.38 | 1.8836 | 208.09 | .1734 |
| 150 | 3254.95 | 2.7125 | 299.65 | .2497 |

For example, if you are using a 19 mm thermal camera, you need to have the camera at a maximum distance of 80 meters to be able to detect a 1 m2 liquid spill. A larger spill can be detected at further distance. In order to detect a spill, it should cover at least 6 pixels across its critical dimension, which is equivalent to 8 pixels per meter at 80 meter distance. Follow camera hardware mounting instructions, and minimize cabling (power and video) in order to prevent signal and power degradation.

Wiring and cabling requirements follow the standards defined by each technology. The following table addresses common applications for each component.

| Part Number | Usage | Cable Type | Max Length |
|---|---|---|---|
| SmrtDVR IVT-DVR405-05 4 ch DVR | Lan/Wan | CAT5e | 100 m |
| SmrtDVR IVT-DVR405-05 4 ch DVR | Digital I/O | UL Shielded | 1000 m |
| SmrtDVR IVT-DVR405-05 4 ch DVR | Serial I/O | UL Shielded | 3 m |
| SmrtDVR IVT-DVR405-05 4 ch DVR | RS485 | UL Shielded | 1000 m |
| SmrtDVR IVT-DVR405-05 4 ch DVR | DC Out | 12 v-5 v | 1 A Maximum |
| SmrtDVR IVT-DVR405-05 4 ch DVR | Audio In | UL Shielded | 3 m |
| Day/Night Camera IVT-C1D190ESHQ | Video | RG6U | 500 m |
| Day/Night Camera IVT-LIT90ESHQ | Video | RG6U | 500 m |
| Thermal Camera IVT-XWTA-19 | Video | RG6U | 500 m |
| All Cameras | Power | Varies | Varies |

Note:
Actual cable lengths vary depending on gauge, type and connectors.

During step up, ensure all required components are connected. This should include the thermal camera connected to a CH, the color camera connected to a CH, the power connected to IGN, the monitor connected to VGA, a USB mouse connected to any USB port, and a keyboard connected to any USB port. In order for the device to connect externally and send alarms, a LAN or Wireless device will also need to be connected and configured according to its requirements.

The DVP 12 may be set up to show operators real-time live feed using connected cameras, allow operators can review recorded video, analyze video images to determine if preset user-defined rules have been broken and decide if real-time alerts need to be generated, send a real-time event notification when a rule has been breached, transmit live video data to monitoring stations, permit access to alarm notification, video data, and analytic setup via Internet Explorer or web access software, and read and write analog and digital inputs and outputs (for example to be used for interacting with local devices such as gate locks and PTZ cameras).

Figure 6:
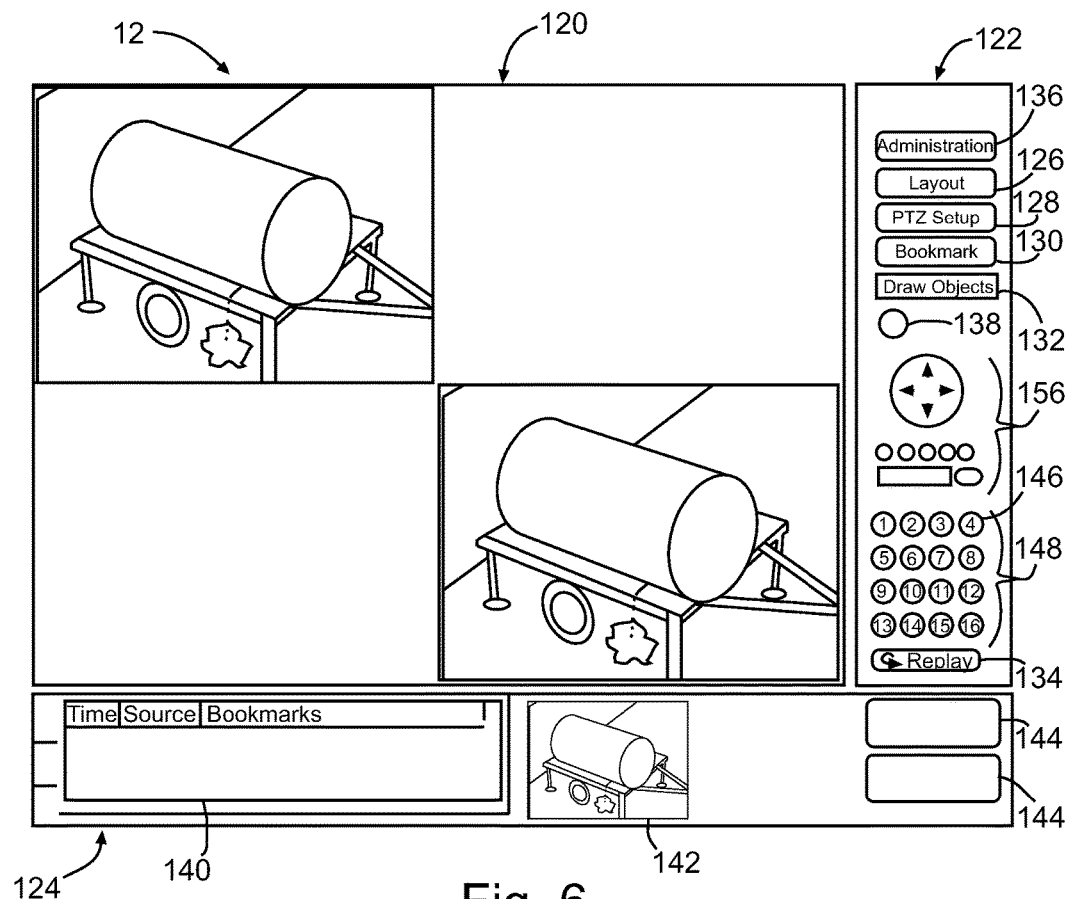
FIG. 6 shows an exemplary display panel for a leak detection digital video recorder.

Referring to FIG. 6, the DVP 12 may include a video panel 120 for displaying one or more of live camera feed (from connected inputs 14), playback of recorded video from the DVP 12 or stored archives and instant display for the alarms video 22. The DVP 12 may be provided with a control panel 122 to access administrative options which may be accessed using administration button 136, provide a Layout button 126 for various layout options, tag video using a bookmark button 130, control the PTZ camera functions, select the cameras, disable or enable analytics and review recorded video using a replay button 134. The DVP 12 may be provided with an alarm control panel 124 including a list 140 of alarms and system events, an alarm quick preview screen 142 and information screens 144 such as the current date and time. Access to the administration interface allows access to the DVP 12 settings, alarm rule setup, as well as exiting the DVP 12.

Layout options are used to configure the way cameras are arranged on the screen. A PTZ setup button 128 may be used for configuration of PTZ camera 26 presets, auto-panning and camera patterns. A bookmark button 130 may be used for manually triggering an alarm. A draw objects button 132 and corresponding function may be used to track moving objects by showing a trail of path (trajectory) as well as the outline of the analytic. A display 138 show free disk space. PTZ Controls 156 may be used to operate a Pan-Tilt-Zoom (PTZ) camera 26 in case one is connected to the system. Presets for PTZ controls can also be set here. Camera controls buttons 146 on the control panel may be used to indicate which cameras are connected and operating. A replay control panel button 134 may be used to switch to the control replay panel for recorded video and activates instant backwards playback of the current video.

Figure 7:
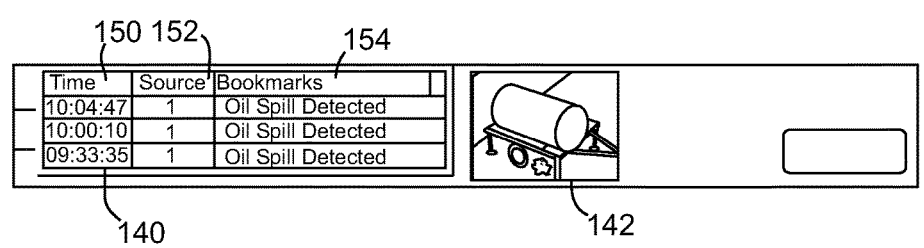
FIG. 7 shows an exemplary event notification panel for a leak detection digital video recorder.

Referring to FIG. 7, an event notification panel may be used including an event notification list box 140 that contains all of the alarms and system events that have occurred since the software was started. These can be alarms that have been triggered by the analytics engine, or notifications intended to inform the operator about something specific such as the state of the software. For example an alarm notification triggered by a fluid leak or spill, or an event notification that the software started successfully. A preview screen 142 may be used to see a snapshot of the event that triggered the alarm, and may be activated by a click on the alarm entry in the grid. Each alarm notification can be sorted by time 150, camera number 152 or bookmark 154 as well as a rapid sort through footage and event isolation.

A Camera Controls panel 148, shown in FIG. 6, comprising the numbered buttons or icons 146 may be used. Each icon 146 represents a single camera, and the number inside is the number of the camera channel. If the icon has green background, it means that the camera is connected to the video channel and that the analytics for this camera are running. If the icon is just green with no red circle this indicates that the camera is on, but there are no analytics running. If the icon has blue background, the video channel is available, but either no camera is connected to the channel, or the camera has lost power. If the icon has a gray background, it means that the video channel is not available for this system. It is also possible that is not available because it has not been enabled by the licensing system.

If a camera is connected to the system and operating correctly, live feeds from the camera will be displayed in the appropriate camera display, alongside with the camera name, date, and other information. When an event alert has been triggered, a red border may be provided to flash on the related camera view window. Layouts and specification of which cameras to operate and view may be controlled by clicks on appropriate portions of the control panels.

Figure 8:
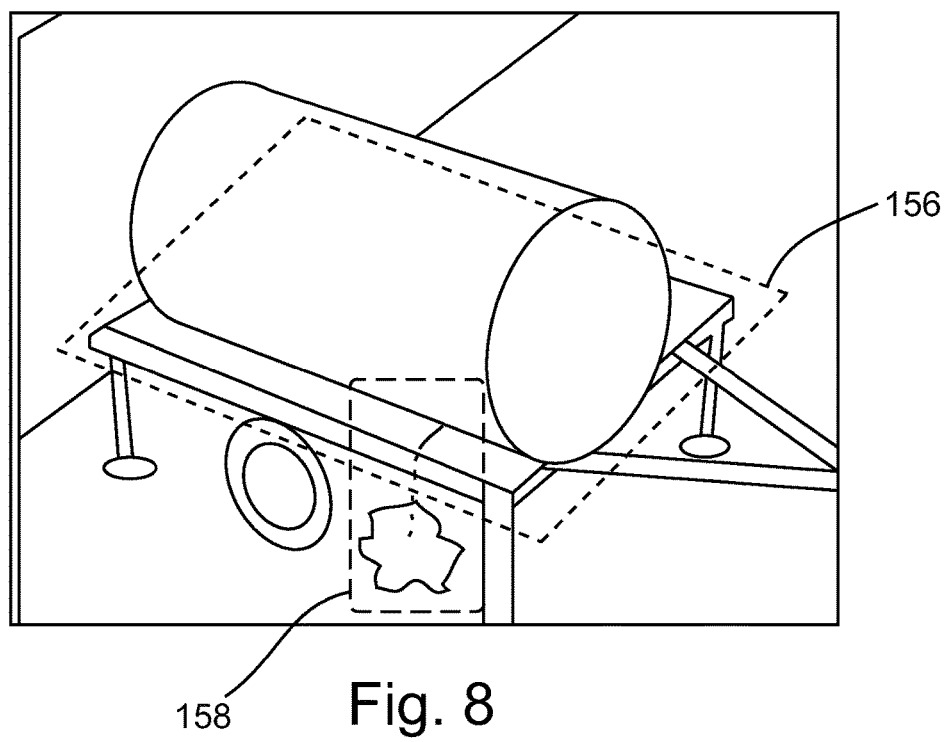
FIG. 8 shows a vessel being monitored along with object areas drawn.

The Draw Objects button 132 may be used to control whether rule areas and objects detected by analytics are displayed on screen alongside with the camera feed. If analytics are enabled for a specific camera, then objects associated with those analytics may be tagged and drawn on the screen. If the Objects option is turned off, even though analytics are running, this may be omitted from the screen. What is then seen is just the raw feed from the camera. If on the other hand, the Draw Objects option has been enabled, the rules area may be outlined 156 in red and distinct objects highlighted 158 on the screen in green. The objects are not necessarily randomly chosen, but instead are the objects identified by analytics. If there are no analytics running for this camera then no objects will be highlighted. No objects will also be highlighted if the analytics are running, but nothing is triggering alarms. This means the analytics are not identifying anything that fits their specified description. For the example in FIG. 8, the analytics were set to detect liquid sprays. The area of interest 156 was set up to look for liquids within that area. In this example, the analytic is running and has identified an object which is indicated in green (rectangular box 158). If no analytics are running, then no analytic boundary will be indicated and no objects will be detected.

Software on the DVP 12 may run as an application on a conventional operating system, for example in the Microsoft Windows XP Embedded environment and can be exited if needed. Under normal working conditions this is not necessary and is not recommended. The application may be designed to run all the time and should not be closed even if the user session is over. However, exiting the software can be helpful when debugging the system.

Depending on the size of the site being monitored, an application of the system 10 may use one or more pairs of thermal camera 24 and color camera 22, preferably mounted along side each other, for outdoor leak detection, one or more color cameras 22 for indoor leak detection and one or more security cameras 26 for example for monitoring one or more access points such as a gate. For example, the outside edge of an evaluation site area of interest may include a gate that vehicles and personnel are required to stop at. As the leak detection solution is based on thermal signatures, personnel (on foot or in vehicles, which radiate heat) that remain in the area for longer than 30 seconds may be required to use a manual switch to temporarily disable the functionality of the DVP 12 in order to prevent a false alarm. This will require training and awareness by personnel on the test site due to the test environment defined. However, it is important to note that this additional requirement will not be applicable to the majority of actual site applications due to remote locations, limited areas of interest, and fewer site visits. Color detection without thermal video may be used in indoor applications such as pump houses, where specific conditions concerning lighting, product color, and collection areas can be controlled.

Fixed station 96 may be used for network management and configuring the security profiles on multiple DVPs 12, viewing live video from cameras (fixed and PTZ), manage system users, generate audio/visual alarm and event notifications for leaks or security, video data management, archiving and summarizing and performing automated system diagnostics to ensure continual system operation.

Figure 9:
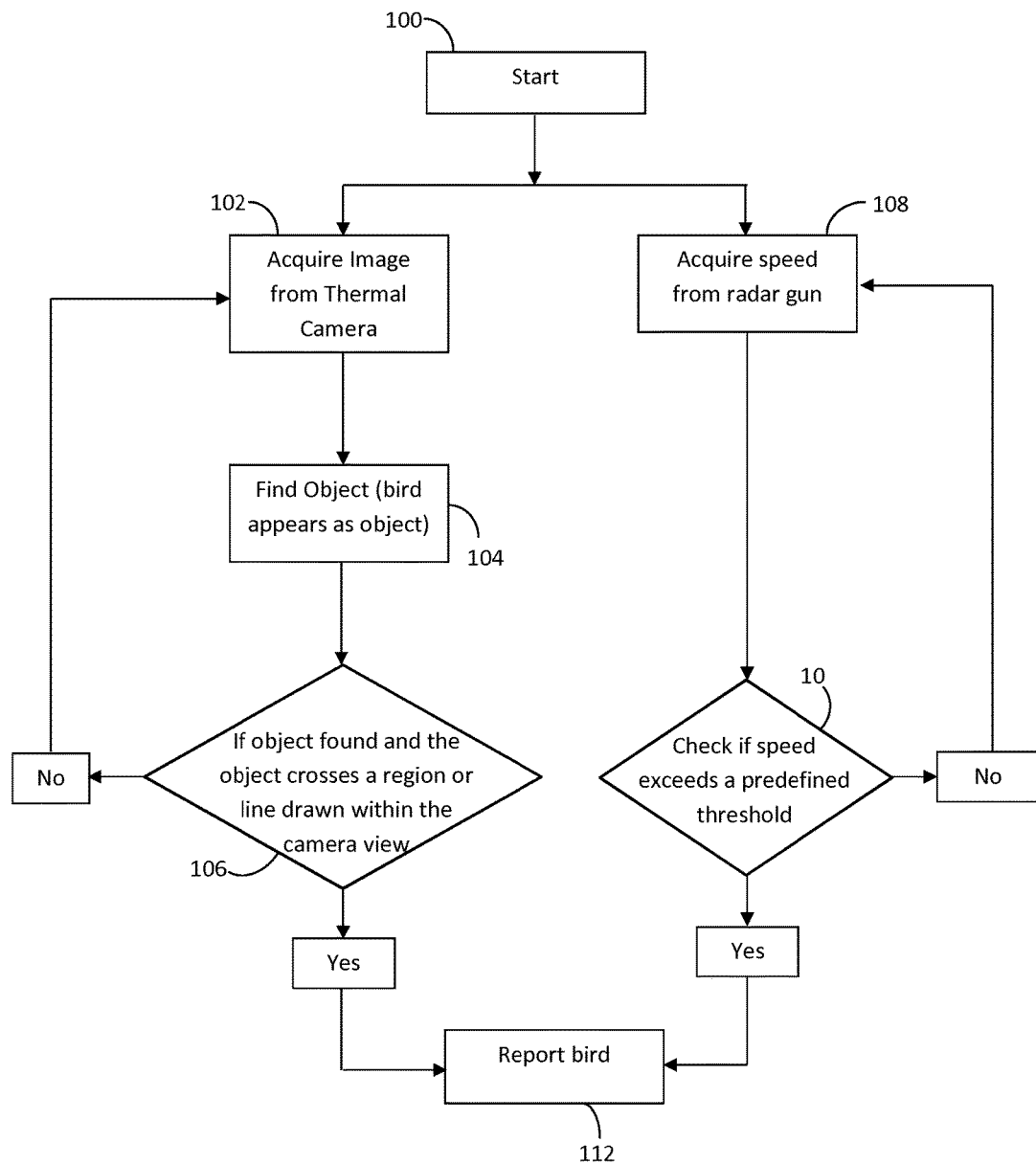
FIG. 9 shows an algorithm for configuring a digital video processor to detect a bird.

The DVP 12 may also be used to identify a bird using the radar gun 32 as shown in FIG. 9. The radar gun 32 is connected via a conventional communication link to provide input signals to the DVP 12 that correspond to an object's speed. The DVP 12 is configured to use the input signals to classify the blob for example as disclosed in FIG. 9. After the process is initiated at 100, an image is acquired at step 102 with the thermal camera 24 and a blob is located at 104 by a conventional detection method such as HASM and identified as a candidate object and tracked. At 106, if the candidate object does not cross a line or region within the field of view of the camera 24, then another image is acquired at step 102 and the process repeated. At 106, if the candidate object crosses a region or line within the field of view of the camera, then the object is flagged as a potential bird. At the same time, at step 108, the DVP 12 acquires input signals from the radar gun 32 that are characteristic of the candidate object's speed. At 110, if the speed of the candidate object does not exceed a predefined speed or bird detection threshold, another speed is obtained with the radar gun 32 that is characteristic of the speed of another or the same candidate object at a later time. If the speed of candidate object is above the bird detection threshold, and the object has been flagged as a potential bird based on location in the field of view of the thermal camera 32, then a bird is reported by the DVP 12.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A leak detection apparatus, comprising:
   a camera having a field of view and producing video output comprising frames;
   a digital video processor configured to receive the video output from the camera, and define an area of interest within the field of view, and to subsequently detect and track a blob in the frames to determine a trajectory for the blob and trigger an alert message if the blob matches leak criteria, the leak criteria including that the blob is within the area of interest, does not appear outside the area of interest and move inside and remains within the area of interest beyond a threshold time.

2. The leak detection apparatus of claim 1 in which the digital video processor is configured to trigger the alert message if the blob remain within the area of interest beyond the threshold time and an alarm if the blob remain within the area of interest beyond a second threshold time.

3. The leak detection apparatus of claim 1 further comprising a weather station and the digital video processor being configured to receive input from the weather station and take the input from the weather station into account in determining whether to trigger the alert message.

4. The leak detection apparatus of claim 1 further comprising a radar gun connected to provide input signals to the digital video processor that correspond to an object's speed and in which the digital video processor is configured to use the input signals to classify the blob.

5. The leak detection apparatus of claim 4 in which the digital video processor is configured to identify the blob as a bird if the blob crosses a region or line within the field of view of the camera and the speed of the blob exceeds a bird detection threshold.

6. The leak detection apparatus of claim 1 in which the digital video processor is configured to filter the blob according to a size of the blob.

7. The leak detection apparatus of claim 1 in which the camera is a thermal camera and in which the blob is detected based on a temperature difference relative to background detected by the thermal camera.

8. The leak detection apparatus of claim 7 in which the blob is detected based on at least a minimum number of pixels showing the temperature difference.

9. An object detection apparatus, comprising:
   a camera having video output comprising frames;
   a digital video processor configured to receive the video output from the camera, detect and track a blob in the frames to determine a trajectory for the blob and trigger an alert message if the trajectory of the blob is characteristic of an object to be detected;
   a radar gun connected to provide input signals to the digital video processor that correspond to a candidate object's speed and in which the digital video processor is configured to use the input signals to classify the blob; and
   the digital video processor being configured to identify the blob as a bird if the blob crosses a region or line within the field of view of the camera and the speed of the blob exceeds a bird detection threshold.

* * * * *